United States Patent
Smyth et al.

(10) Patent No.: US 6,598,229 B2
(45) Date of Patent: *Jul. 22, 2003

(54) SYSTEM AND METHOD FOR DETECTING AND CORRECTING A DEFECTIVE TRANSMISSION CHANNEL IN AN INTERACTIVE INFORMATION DISTRIBUTION SYSTEM

(75) Inventors: Aidan J. Smyth, San Francisco, CA (US); Christopher Goode, Menlo Park, CA (US)

(73) Assignee: Diva Systems Corp., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,340

(22) Filed: Nov. 20, 1998

(65) Prior Publication Data

US 2002/0007492 A1 Jan. 17, 2002

(51) Int. Cl.$^7$ .......................... H04N 7/173; H04L 12/26; H04L 1/00; H04J 1/16; H04J 3/14
(52) U.S. Cl. ........................ 725/107; 348/192; 348/180; 714/712; 714/48; 714/6; 714/2; 370/216; 370/225
(58) Field of Search ............................ 348/7, 8, 12–13, 348/192–193, 180; 709/219, 231; 455/52, 62, 103; 370/225–228, 216; 714/18, 2–3, 6, 12, 43, 48, 712–716; 725/107, 121, 149; 340/507–508, 41, 3.43, 3.44; 702/184–187; 700/21, 79, 82

(56) References Cited

U.S. PATENT DOCUMENTS 3,920,975 A * 11/1975 Bass ........................ 714/716
4,068,105 A * 1/1978 Jain et al. ................... 714/43

(List continued on next page.)

FOREIGN PATENT DOCUMENTS

| EP | 0 742 671 A1 | 11/1996 | .......... H04N/7/173 |
| WO | WO 98/31115 | 7/1998 | |

Primary Examiner—Andrew Faile
Assistant Examiner—Hai V. Tran
(74) Attorney, Agent, or Firm—Moser, Patterson & Sheridan, LLP (57) ABSTRACT

An interactive information distribution system according to the present invention includes a session control manager having a defective channel detection module, a channel re-allocation module, and a replacement-signaling module. The session control manager is coupled to receive signals from the plurality of set top boxes, and coupled to control the digital video modulators and the assignment of communication channels to nodes. The defective channel detection module receives signals from the plurality of set top boxes, and based on the error rate and other factors determines if any of the communication channels used by the digital video modulators are defective. Upon determining that a particular communication channel is defective, the defective channel detection module signals the channel re-allocation module. The channel re-allocation module re-allocates the streams being transmitted over the defective communication channel so that they are transmitted over the other unaffected and non-defective communication channels. The replacement signaling module also identifies the defective digital video modulator and transmits this information to the network management system which in response follows a pre-defined procedure such as paging service personnel to replace the defective digital video modulator. A method for detecting and correcting a defective transmission channel is also part of the present invention.

20 Claims, 5 Drawing Sheets

U.S. PATENT DOCUMENTS

| | | | | |
|---|---|---|---|---|
| 5,586,121 A | * | 12/1996 | Moura et al. | 370/404 |
| 5,784,597 A | * | 7/1998 | Chiu et al. | 713/401 |
| 5,815,146 A | | 9/1998 | Youden et al. | 345/327 |
| 5,874,992 A | * | 2/1999 | Caporizzo | 348/192 |
| 5,926,547 A | * | 7/1999 | Heieis et al. | 380/210 |
| 6,295,615 B1 | * | 9/2001 | Cohen | 714/712 |
| 4,541,121 A | * | 9/1985 | Blum | 455/103 |
| 5,155,590 A | * | 10/1992 | Beyers, II et al. | 348/12 |
| 5,412,416 A | * | 5/1995 | Nemirofsky | 725/36 |
| 5,504,856 A | * | 4/1996 | Sasaoka | 714/3 |
| 5,563,883 A | * | 10/1996 | Cheng | 370/449 |

\* cited by examiner

SYSTEM AND METHOD FOR DETECTING AND CORRECTING A DEFECTIVE TRANSMISSION CHANNEL IN AN INTERACTIVE INFORMATION DISTRIBUTION SYSTEM

BACKGROUND OF THE INVENTION

1. Field of the Invention

The present invention relates generally to information distribution systems and methods for delivering interactive information services. In particular, the present invention relates to a system and a method for automatically detecting and correcting defects in a transmission channel of an interactive information distribution system. Still more particularly, the present invention relates to a system and method for correcting defects in a transmission channel of an interactive information distribution system that does not require any additional hardware.

2. Description of the Related Art

Recent advances in digital signal processing techniques and, in particular, advancements in digital compression techniques, have produced a number of ways to provide new digital services to a subscriber's home via existing telephone and coaxial cable networks. For example, it has been proposed to provide hundreds of cable television channels to subscribers by compressing digital video, transmitting the compressed digital video over conventional coaxial cable television cables, and then decompressing the video at the subscriber's set top terminal.

Another proposed application of this technology is a movie-on-demand video system in which a subscriber communicates directly with a video service provider via telephone lines to request a particular video program from a video library and the requested video program is routed to the subscriber's home via telephone lines or via the coaxial television cables for immediate viewing.

However, one particular problem in information distribution systems is maintaining a level of quality and uninterrupted service to subscribers. Whether such systems are digital, analog, interactive or unidirectional, they are subject to equipment failures that can interrupt the information services being provided. Most often such equipment failures are first detected when a subscriber calls the system operator to complain about the lack of service. The system operator must then determine which of a myriad of system components is defective and dispatch service personnel to correct the problem. Thus, there is a need in information distribution systems of a way to ensure level of quality and uninterrupted service to subscribers.

One approach in the prior art has been to provide redundant hardware that can be switched on when a particular component fails to provide fault tolerance. However, such an approach obviously doubles the cost of implementing an information distribution system, and can be prohibitively expensive. In interactive system, some redundant hardware must be provided to accommodate requests for particular content from the subscriber. Such systems are typically optimized to provide the minimum amount of hardware necessary to service the requests from subscribers at peak request times without affecting the quality of service to subscribers. It should also be noted that in such interactive systems, there is a return path of communication between the subscriber/terminal and the system. Even in such systems, failures to provide quality service may occur in the servers, the cable plant, the modulators or the set top terminals. Thus, there is a need for a system that can identify defective components and take corrective action to restore uninterrupted service as soon as possible. The best solutions would occur without affecting the service provided to the subscriber.

Therefore, there is a need for a system and method that provides a particular level of service. More particularly, there is a need for a system and method for automatically detecting defective communication channels and correcting the defect so that a particular level of service is maintained.

SUMMARY OF THE INVENTION

The present invention overcomes the deficiencies and limitations of the prior art with a system and a method for detecting and correcting a defective transmission channel in an interactive information distribution system. An interactive information distribution system according to the present invention includes a customer management system, a network management system, a resource manager and video server, a session control manager, a plurality of digital video modulators, a plurality of modems, head end equipment and a plurality of set top terminals or boxes. More particularly, the session control manager includes a defective channel detection module, a channel re-allocation module, and a replacement-signaling module in addition to other applications and an operating system. The session control manager is coupled to receive signals from the plurality of set top boxes, and coupled to control the digital video modulators and the assignment of communication channels to nodes. The defective channel detection module receives signals from the plurality of set top boxes, and based on the error rate and other factors determines if any of the communication channels used by the digital video modulators are defective. Upon determining that a particular communication channel is defective, the defective channel detection module signals the channel re-allocation module. The channel re-allocation module, in response to a signal from the defective channel detection module, re-allocates the streams being transmitted over the defective communication channel so that they are transmitted over the other communication channels. The defective channel detection module also signals the replacement-signaling module. The replacement signaling module identifies the defective digital video modulator and transmits this information to the network management system which in response follows a pre-defined procedure such as paging service personnel to replace the defective digital video modulator.

The present invention also includes a method for detecting and correcting a defective transmission channel comprising the steps of: monitoring communication channels for errors, detecting an error in a communication channel, determining whether the communication channel upon which the error was detected is defective, determining the digital video modulator servicing the channel, determining whether there is another digital video modulator, re-assigning the communication channel to the other digital video modulator, and signaling that a particular digital video modulator needs replacement.

DETAILED DESCRIPTION OF THE PREFERRED EMBODIMENTS

The present invention will now be described in the context of an interactive information distribution system 100 that provides an individual or a plurality of subscribers with information such as multimedia programming, audio, video, graphics, and the like. This information is preferably available in an "on demand" basis. Furthermore, the system 100 enables subscribers to control, in real-time, the presentation of the information, e.g., requested stream can be started, stopped, paused, reversed, fast forwarded and branched without substantial latency. The information could also be supplied to the subscribers through broadcast, where all subscribers receive the same information; pointcast, where each subscriber receives specific information that is only addressed to a specific subscriber; or narrowcast, where a subset of all the subscribers received particular information.

The system 100 as a whole is first discussed below in summary fashion. However, the inventive component subsystem, namely the session control manager and the automatic detection and the correction for defective digital video modulators, are individually discussed in detail below.

A. System 100

Figure 1:
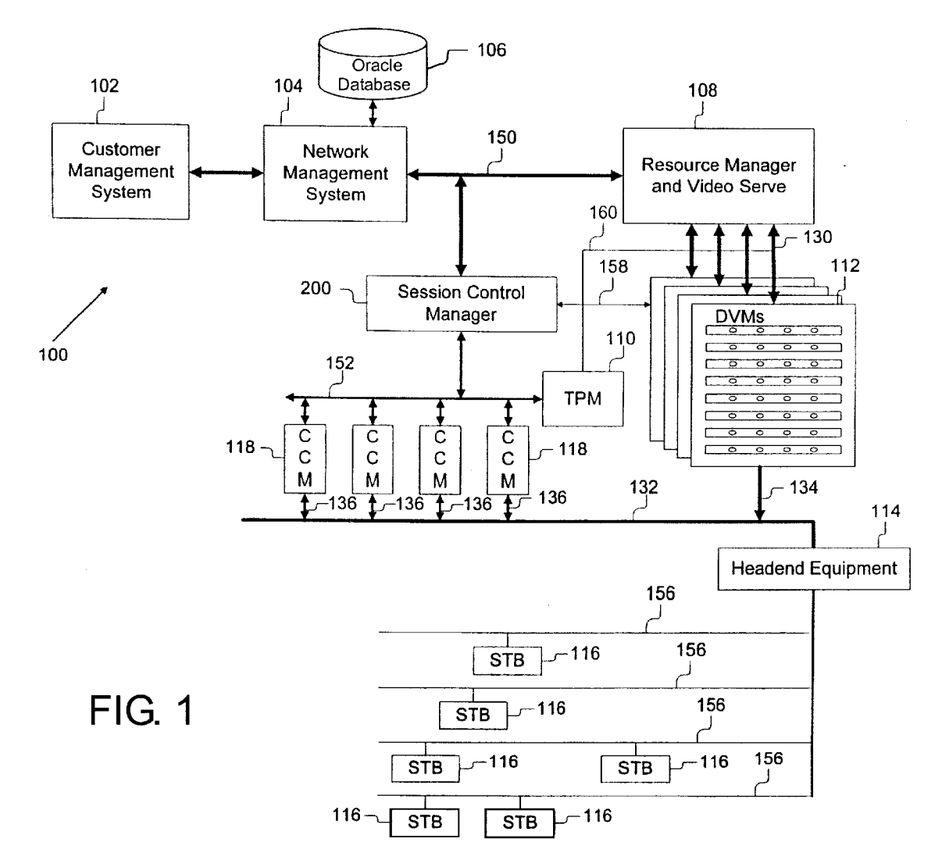
FIG. 1 shows high-level block diagram of an interactive information distribution system in accordance with the present invention.

Referring now to FIG. 1, a high-level block diagram of the interactive information distribution system 100 of the present invention is shown. The system 100 preferably comprises a customer management system 102, a network management system 104, a database 106, a resource manager and video server 108, a transport processing module 110, a plurality of digital video modulators (DVM) modules 112, a plurality of control channel modems 118, head end equipment 114, a plurality of set top terminals or boxes (STB) 116, and at least one session control manager 200.

The resource manager and video server 108 provides a plurality of packetized data streams and a synchronization clock signal, via path 130 to the plurality of digital video modulator (DVM) modules 112. Alternatively, the plurality of data streams is multiplexed onto an optical fiber (a trunk) and each session control manager 200 is connected to the trunk by a "drop line." The number of session control managers 200 is proportional to the number of subscribers being serviced by the system, e.g., each session control manager 200 can generally service up to 2000 subscribers. The server 108 provides video information (data streams) in response to specific information requests from the session control manager 200 that are communicated to the server 108 through a communications network 150. The session control manager 200 provides various system command and control functions for communication of the data streams to the cable network 132. As such, the system's three directional communications channels to perform control and communication operations. The session control manager 200 may address the streams to be propagated to the subscribers in broadcast, narrowcast, or pointcast modes.

Specifically, the DVM module 112 modulates each of the baseband data streams onto a carrier signal and upconverts the signal to a transmission frequency that complies with conventional cable television (CATV) frequency spectrum. Illustratively, the downstream data modulation, is, for example, 64-ary quadrature amplitude modulation (QAM) and the transmission frequency is in the range 50 to 750 MHz. Other modulation types and frequency bands may be used. This information is coupled to the cable network 132 via path 134 and is carried through the cable network 132 on what is referred to as the information channel.

The session control manager 200 also transmits control information through a downstream command channel (path 160) contained within the cable transport network 132 to the STB 116. This command and control information is transmitted on a carrier in the range 50 to 750 MHz using a 1 MHz bandwidth, e.g., the command information is frequency multiplexed with the information channel and transmitted through the network 132. Furthermore, the STB 116 communicates via a reverse (or back) channel to the session control manager 200 through the cable transport network 132 and the reverse channel path 136. There are typically 16 such reverse channels supported by each session control manager 200. Each reverse channel carries, for example, a BPSK modulated signal on a carrier in the range 5–42 MHz, where the channel capacity is approximately 64 KBPS. Other frequency ranges, modulation types or channel capacities may be used.

In addition to the information that can be interactively manipulated, the system 100 provides for communication of conventional cable television signals (analog signals) to the STBs 116. Specifically, a conventional cable signal source (not shown) is part of a conventional cable head end 114. As such, the conventional cable signals propagate to the STBs 116 to supplement the interactive information provided by the service provider.

The cable transport network 132 is typically, but not exclusively, a conventional bi-directional hybrid fiber-coax cable network having forward information channel (in-band upstream information channel) operating a 50 to 750 megahertz. On the upstream side of the head end 114, the cable transport network 132 is preferably HFC/Fiber and on the downstream side of the head end 114, the cable transport network 132 is preferably HFC/coax. Depending upon the fiber node size, the invention requires between two and five available conventional cable channels (e.g., 6 MHz bandwidth channels) to effectively provide service to approximately 2000 subscribers. In addition to the downstream information channels that carry the broadband information to the subscriber STBs 116, the network 132 must also support the downstream command channel (forward command control channel, out-of-band channel, operating at 50–750 MHz) and the upstream "back" channel (reverse or back channel, out-of-band channel, operating at 5–42 MHz). The cable transport network further contains conventional receiver/bridger amplifiers and line amplifiers to insure that a high-quality signal is received by each of the STBs 116 connected to the network. As such, the network is capable of supporting three uni-directional channels. Although the cable transport network is illustratively described as a hybrid fiber-coax network, other network forms may be used such as all fiber, all coax, or any other broadband communications network that will support three unidirectional communications paths.

The STB 116 is coupled to the cable transport network 132 by the head end equipment 114 and divided into several nodes 156. Each STB 116 also has an associated input device and a display device (not shown). The STB 116 receives the QAM modulated signal from the cable transport network 132 and demodulates the downstream signals including those propagated through both the command channel and the information channel. The STB 116 also optionally demodulates standard cable television signals received from the network 132. Thus, a single STB 116 can be used to receive all the cable services provided by the network 132. The STB 116 also provide interactive control of the information presentation. The presentation is controlled via the input device, e.g., an infrared (IR), radio frequency (RF), or some other remote control unit. The information, e.g., audio, video, still photographs, graphics, multimedia programs and the like are portrayed on the display device such as a television, video monitor, stereo system and the like.

The network management system 104 manages the system assets, provides security measures, and ensures synchronization of all system 100 components. The network management system 104 is coupled to a database 106 for storing security, user identification and other information necessary to implement a video on demand system. The network management system 104 communicates with all the system components via communication bus architecture. This bus maybe implemented using a conventional ETHERNET or a standard communications or, standard networking architecture. The network management system 104 also communicates with the customer management system 102 that maintain the subscriber account management software. This software performs billing and accounting functions to correlate the subscriber identification numbers with information resources that are requested and the price of that information resource. Such customer management system 102 do not form any part of the present invention; therefore, this system component will not be discussed any further, but is mentioned here for completeness.

B. Resource Manager and Video Server 108

The resource manager and video server 108 is typically a parallel processing computer system capable of accepting information requests from the session control manager 200, recalling that information from memory and generating a plurality of program streams containing the information. One such server is the SARNOFF SERVER computer system manufactured by Sarnoff Real Time Corporation of Princeton, N.J. SARNOFF SERVER is a trademark of Sarnoff Real Time Corporation. The SARNOFF SERVER computer system has an input bandwidth of 5.4 Gbps and, at maximum capacity, can serve up to 10.8 Gbps of program material. The program information may be stored within the computer system's disk drive array, an off-line storage system such as an optical disk library, and/or is available from a real-time program feed (digital or analog).

The server 108 provides a plurality of time division multiplexed data streams, e.g., thirty-two, containing the information requested by the video session managers to service requests for a plurality of subscribers. These signals may comply with the MPEG-2 standard for so-called, "elementary streams", "system streams" and "transport streams." These data streams are generally formatted into transport packets, which comply with the MPEG-2 transport protocol or a similar transport protocol. The packetization and multiplexing process may be accomplished within the transport processing module 110; however, the packetizing may be more efficiently handled by an output subsystem of the server or the data can be pre-packetized and stored in the data storage devices associated with the server. As such, the server 108 provides requested information in a plurality of transport streams having the information requested by many subscribers packetized and multiplexed into thirty-two independent streams. Each packet carries a TID of a requesting STB 116 and is presented to the session control manager 200 on a particular output port, e.g., one of the 32 ports. Additionally, the server 108 provides the high accuracy clock signal (reference signal) on 130.

Alternatively, the plurality of data streams are multiplexed onto an optical cable and a "multidrop" technique is used to distribute the streams to the various session control managers 200. Specifically, a plurality of "drop lines" connect the session control managers to the optical cable (a trunk) and the streams are addressed to the appropriate session control manager.

C. Digital Video Modulator Module 112

The digital video modulator (DVM) module 112 (also known as a DVM shelf) contains a stream distributor, a plurality of DVMs and an output module (coax cross connect). The stream distributor routes the plurality of data streams from the server 108 to all DVMs. Each DVM has two output ports that service one or two neighborhoods. Furthermore, each of the output ports may carry either one or two information channels. In this manner, the DVM module 112 generates four digitally modulated channels that are independently frequency agile. An output combiner combines the 4 channels into two pairs of two channels.

Further, each DVM contains four modulators that modulate each transport stream into a 64-ary QAM signal with block interleaving and forward error correction. An upconverter then upconverts the QAM signal to a particular frequency for transport on the cable network, e.g., a frequency in the range 200 to 750 MHz is commonly used. Frequency selection and the modulation process is controlled by a controller operating under control of a DVM interface 320 of the session control manager 200.

Each of the DVMs (generally there are eight DVMs) modulates eight data streams. The output module, e.g., a coax cross connect unit, combines the downstream information channel with the downstream command information produced by the session control manager 200.

The session control manager 200 includes a DVM interface 320 for communication with the DVMs 112. The system 100 also includes a plurality of control channel modems (CCMs) 118. The control interface 159 has a conventional local area network architecture for communicating between the server 108 and the session control manager 200. The DVM interface 320 has a conventional RS-482 serial bus architecture that interconnects to controllers for each DVM and the session control manager 200. Other multipoint bus architectures, such as ETHERNET, may be substituted for the RS-482.

The control channel modems 118 terminate the upstream and downstream control signals from/to the STBs 116. A single command and control modem can be used for each network node 156 or a plurality of nodes, depending upon the communications traffic. Within each modem, the upstream demodulator is illustratively a binary phase shift key (BPSK) demodulator, while the downstream modulator is, for example, a quadrature phase shift key (QPSK) modulator. Of course, other modulation formats could be used. There are typically four upstream demodulators for every downstream modulator. The control channel modems 118 are coupled to the session control manager by bus 152 that is preferably a VME bus.

The session control manager 200 is implemented using a commercially available microprocessor and operating system. The microprocessor must be fast enough to handle the control functions in real time.

In particular, the session control manager 200 forms an interface to the STBs 116 as well as the DVM modules 112 and the control interface (e.g., VME bus 152 in FIG. 1). The session control manager's 200 responsibilities include set top terminal sign-on and time out, authentication, configuration, and control protocol termination; alarm management and frequency assignment; session security; service selection and control; event notification and usage metering; and a subscriber's access to account information. Commands and requests from the set top terminals are processed by the session control manager 200 and appropriate requests are made to the file server to perform certain information navigation and movie-on-demand functions.

D. Control Channel Modems 118

The session control manager 200 communicates with its STBs 116 through a plurality of control channel modems (CCM) 118. A neighborhood is generally serviced by one or more CCM; however, broadly speaking a given CCM may service multiple neighborhoods and a plurality of neighborhoods may be serviced by a given CCM. The STBs 116 which are connected to a given CCM 118 must contend for the upstream channel that is available for propagating control signals from the STBs 116 to the CCM 118 and session control manager 200.

The CCM 118 modulates transmitted data blocks onto the downstream command channel and demodulates received data blocks from the upstream back channel. The upstream bandwidth is roughly 64 kilobytes per second, while the downstream bandwidth is approximately 1 megabit per second. The CCM 118 also provides a robust error detection and correction process.

The CCM 118 is frequency configurable for both upstream and downstream channels. Upon installation of the system 100, the cable transport network 132 is analyzed to locate the least noisy portion of the available spectrum. The STBs 116 are then set to transmit and receive on the selected frequencies having the least noise. The CCMs 118 are configured to use the frequencies programmatically from the session control manager 200. The session control manager 200 interfaces to the CCMs 118 through a session control manager 200 shelf backplane using a shared memory mailbox approach within the VME bus architecture. A simple reliable link protocol is applied in both directions resulting in guaranteed delivery of data packages.

Since there is only one CCM 118 that transmits per path in the downstream direction, and the upstream and downstream paths are independent, downstream signal collision cannot occur. Therefore, the CCM 118 may transmit whenever it has data to send. Similarly, every STB 116 simply transmits whenever it has data to send. No carrier sense or collision detection need be performed. When the CCM 118 receives a message, it transmits an acknowledgment to the sending STB 116. If the transmitting STB 116 does not receive an acknowledgment within the time it takes the packet to be transmitted, processed and acknowledged, the STB 116 assumes that the message was interrupted and not received. In that case, the STB 116 performs a random backoff and then retransmits the message. A sequence number per STB 116 is employed to prevent duplicate messages from being passed up to higher layers of the session control manager 200 software. Since collision detection is not performed, there is no relationship between the minimum packet size and the maximum distance between two nodes in the network.

A low frequency "keep alive" poll, on the order of every five minutes, is required by the STB 116 that have been powered off so that streams allocated on those DVMs 112 can be released for use by other subscribers. The polling frequency determines the worst case length of time between a subscriber removing power and the session control manager 200 reallocating the stream and ceasing the subscriber billing function.

The downstream command channel does not have collisions, but it is still subject to lost packets due to the network noise. Therefore, the STB 116 returns an acknowledgment whenever it receives a message from the CCM 118. If the acknowledgment is not received in the time it takes for the message to be transmitted, received, processed and an acknowledgment queued and transmitted, the message will be resent. Note, since there can be no collisions, a backoff period is not required.

E. Transport Processing Module (TPM) 110

The system 100 also includes a transport processing module (TPM) 110 to add control signals and data to the streams generated by the DVMs 112. The TPM 110 is preferably coupled to the session control manager 200 and to the CCMs 118 through the VME bus architecture 152. The TPM 110 is also coupled to the DVM module 112 by line 130 to provide for in-band communication. The TPM 110 also has the capability to detect failures within the TPM 110. Such failures are reported by communication over the bus 152 to the session control manager 200. More specifically, the TPM 110 also adds identification information to the video and audio content provided by the server 108 such as program specific information (PSI) and packet identification numbers (PIDs).

F. Session Control Manager 200

Still referring to FIG. 1, the operation of the session control manager 200 will be described in more detail. Although FIG. 1 only shows a single session control manager 200, those skilled in the art will recognize that the system 100 generally uses multiple video session managers 200 and associated DVM modules 112. Each manager 200 provides information to up to 16 conventional cable transport network nodes ("neighborhood nodes") 156 having up to 2000 subscribers each. Each session control manager 200 distributes up to 320 different program streams to the nodes 156.

The system 100 provides fixed multiplexing rates, i.e., 8 sub-rate server channels of 3.37125 Mbps, or less than 8 super rate channels, e.g., multiples of the 3.37125 Mbps. For special transmissions that require superior bandwidth, a program can be sent using a plurality of channels. For example, the bandwidth required to adequately present a basketball or football program is probably greater than the bandwidth required to adequately present a black and white movie.

Figure 2:
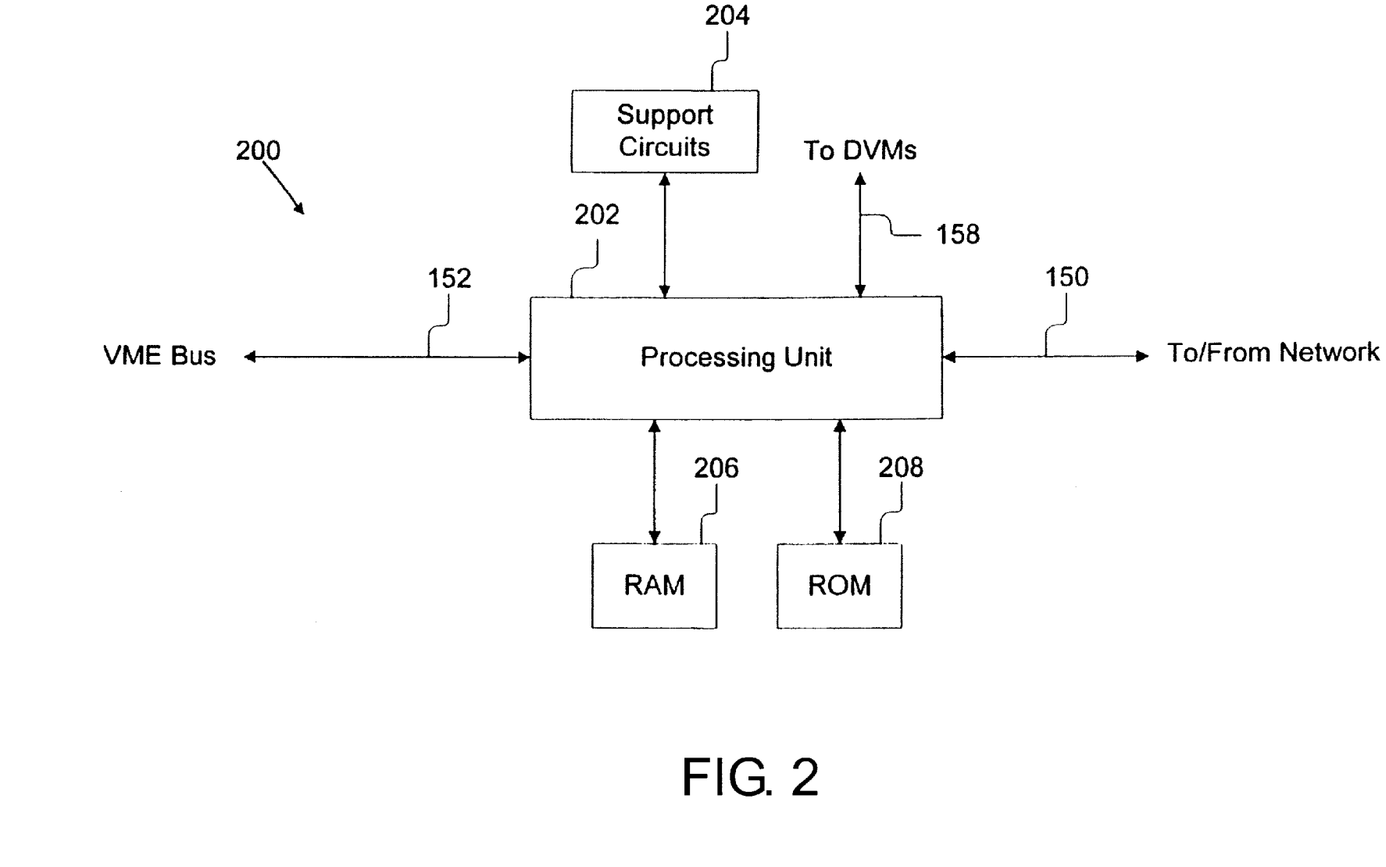
FIG. 2 illustrates a preferred embodiment for the session control manager computer of the present invention.

Referring now to FIG. 2, a block diagram of one embodiment of the session control manager 200 is shown in more detail. The session control manager 200 preferably comprises a central processing unit (CPU) 202, random access memory (RAM) 206, read only memory (ROM) 208 and CPU support circuits 204 such as clock, cache, power supplies and the like. The session control manager 200 is coupled to the network management system 104 and the resource manager and video server 108 by a network interface 150 that preferably uses a TCP/IP and UCP/IP protocols for communication. The session control manager 200 is also coupled to the plurality of CCMs 118 and the TPM 110 by a VME backplane interface 152. Finally, the session control manager 200 is coupled to control the DVMs 112 using the DVM interface 320 that communicates signals to the DVMs 112 via line 158.

The processing unit 202 is a 68K family microprocessor available from Motorola. Preferably, the microprocessor within processing unit 202 is the 68040 enhanced 32-bit microprocessor having 8 kilobytes of cache, MMU and FPU, and running at a clock speed of approximately 25 to 33 MHz. Such a microprocessor including a VME bus interface, on-board RAM, a SCSI interface, non-volatile memory, communication ports, various clocks and timers, an RS-482 transceiver interface, and ROM is available on a single CPU circuit card as a model number MVME167 from Motorola. The card is installed in a NEBS compliant chassis. Alternatively, the MVME162 model circuit card also available from Motorola can be used. Either of these cards are plugged into a slot VME backplane available from Motorola as part number MC1 120.

The ROM 208 contains software that is capable of performing "power on self test" and booting a software image from a network. The ROM 208 is approximately 256 kilobytes, and programmed during manufacturing to store a network address, serial number, date of manufacture, and component revision levels. There is no requirement to save any other configuration information across a system boot.

Figure 3:
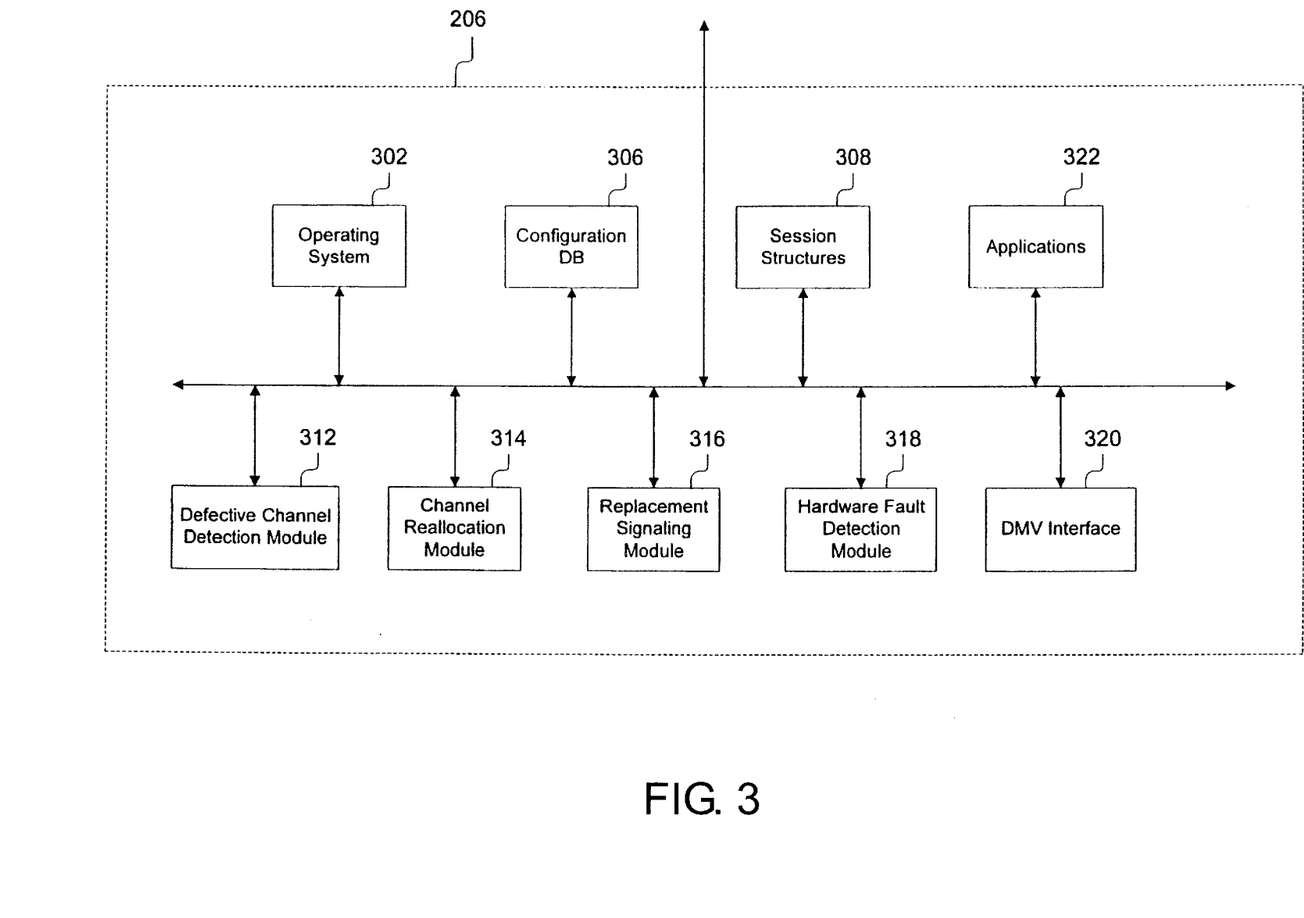
FIG. 3 is a block diagram of a preferred embodiment for a memory of the session control manager computer.

Referring now to FIG. 3, the RAM 206 is shown in more detail. The RAM 206 preferably comprises an operating system 302, a configuration database 306, session structures 308, a defective channel module 312, a channel re-allocation module 314, a replacement signaling module 316, a hardware fault detection module 318, and a DVM interface 320, and one or more application program(s) 322. The programming for the session control manager 200 is conducted using object oriented programs.

A number of operating systems 302 are available for use by the hardware including the pSOS$^+$ available from Integrated Systems, Inc., the Vx Works available from Wind River Systems, VRTX available from Microtec Research, Inc., QNX available from QNX Software Systems, Ltd., and OS/9 available from Microware. The operating systems 302 may be any one of these operating systems.

The configuration database 306 describes how the hardware is configured, e.g., which DVMs 112 are active or standby, available frequencies, terminal configuration information, DVM information and the like. The configuration database 306 is either downloaded or recovered from local non-volatile storage.

The defective channel module 312 monitors the communication between the DVMs 112 and the STBs 116. In particular, the defective channel module 312 receives, tracks and interprets error signals sent by the STBs 166 back through the CCMs 118 via the VME bus 152 to the session control manager 200. The defective channel module 312 processes error signals received from the STBs 116 and determines whether a particular channel being used by the DVMs 112 to transmit content has a level of service that makes it "defective" or not operational. For example, a particular STB 116 may indicate (1) a time out signal, (2) waiting for stream assets or data on a particular channel, or (3) a degraded signal to noise performance of a channel; any one of which could be an indication of a potentially defective channel. The defective channel module 312 also determines whether the problem is global or local by correlating the channel monitoring information from the STBs 116. The signal integrity information may then be combined with alarm data from individual hardware elements to notify of an equipment failure or detect cable plant signal degradation as will be discussed below with reference to the replacement signaling module 316.

The defective channel module 312 provides two coordinates to identify a fault in the system 100, namely, a channel and a DVM. The particular methods for determining whether a channel provides the requisite level of service will be described in more detail below with reference to FIGS. 4 and 5, but could include: 1) determining whether a particular number of error signals are received within a pre-defined time frame, 2) determining whether the number of error signals received is greater than a pre-defined threshold, 3) determining whether a number of STBs 116 using the same channel have reported errors, 4) determining whether a number of STBs 116 using a set of four channels assigned to the same DVM have reported errors, and 5) determining whether a given number of channels are not operational for a particular modulator. Those skilled in the art will recognize that various other combinations of defects based on particular failures, time or frequencies of failures and attempts to communication on a channel could also be used to indicate that a channel is "defective." Once the defective channel module 312 determines that a channel is defective, the defective channel module 312 signals the channel re-allocation module 314 so that the data streams being transmitted over the defective channel can be re-assigned to other channels communicating with the same node 156. The defective channel module 312, upon determining that a channel is defective, also signals the replacement signaling module 316 to take prescribed corrective action so that the defective hardware may be inspected and replaced if necessary. The present invention is particularly advantageous in that streams are automatically re-assigned to good channels serving the same node 156 by the channel re-allocation module 314 in response to a signal from the defective channel module 312, thus, maintaining quality service to customers without them even knowing of possible defect in communications channels.

The channel re-allocation module 314 controls the allocation of channels to nodes 156 in response to user requests via their respective STBs 116. More particularly, the channel re-allocation module 314 is responsible for communicating with the server 108 via the network interface 150 and for communicating with the DVMs 112 via the DVM interface 320 and line 158. Such communication and control allows the channel re-allocation module 314 to allocate particular, DVMs 112 and their channels for communication with particular nodes 156 of the system 100. The system 100 is capable of dynamically allocating information channel resources to the subscribers. The channel re-allocation module 314 performs this function. Allocation decisions are predicated on subscriber program requests and subscriber resource usage. For example, programs may be characterized according to program content during, e.g., a storage or pre-transmission operation. Such a characterization provides an indication of a necessary, desirable or optimal information channel resource level (i.e., bandwidth). A subscriber requesting a program requiring a high information channel resource level (e.g., a basketball game) will be allocated an additional sub-rate channel or a super rate channel (if available). A subscriber requesting a program requiring a low information channel resource level (e.g., a black and white movie) will be allocated fewer (or only one) sub-rate channels. If a subscriber having been allocated one or more sub-rate channels or a super rate channel terminates a session, the bandwidth released by the terminating subscriber may be re-allocated among the remaining active subscribers. Ideally, all subscribers receive programs with an optimal information channel resource level. The system 100 monitors various loading parameters and makes resource allocation decisions in accordance with this ideal. When a session ends, the session control manager 200 terminates the session and clears that particular session database. If pause is selected, after a delay (e.g., 2 minutes) the session is ended.

The channel re-allocation module 314 is also responsive to signals from the defective channel module 312. The signal provided from the defective channel module 312 indicates that a channel is defective, and identifies the channel. The channel re-allocation module 314 in response to the signal from the defective channel module 312, modifies the transport streams such that they no longer use the channel identified by the defective channel module 312 to be defective and are preferably distributed over the remaining channels communicating with the particular node 156. For example, conventional techniques such as re-multiplexing and other rate control mechanisms may be used to re-distribute the content among the available channels. In some cases, this may require that the channel re-allocation module 314 initializes and creates a new communication channel, if one is available, to communicate with the node 156. In the preferred embodiment, the channel re-allocation module 314 first attempts to use any channels or DVMs 112 that are not being used. If all channels are being used, the channel re-allocation module 314 distributes the data streams that are using the defective channel across the remaining good channels. The combination of the channel re-allocation module 314 and the defective channel module 312 are particularly advantageous because they provide a method for detecting service affecting failures due to an in-band modulator and correct the problem in a manner that is transparent to the customer. Moreover, such a result is achieved with no additional hardware costs since the data streams are distributed over the remaining or already existing channel bandwidth.

The replacement-signaling module 316 is also responsive to signals from the defective channel module 312. The signal provided from the defective channel module 312 indicates that a channel is defective, and identifies the channel and the DVM 112 servicing the channel. In response, the replacement-signaling module 316 generates a message and sends the message over the network 150 to the network management system 104. The network management system 104 then responds with any of a variety of pre-programmed responses. For example, the network management system 104 may be set such that field service personnel are paged and dispatched to test and replace the defective DVM 112. Also, the network management system 104 may log and track such defects for service and network administration purposes. Any number of other responses might also be programmed or set by the network management system 104. The replacement signaling module 316 is responsible for signaling to the network management system 104 any defects, whether they are in a particular channel or various other types of faults that are monitored and detected by the system 100 as will be discussed below.

The session control manager 200 also includes a hardware fault detection module 318. Each of the components of the system 100 used to deliver the video and audio signals on a given channel to the subscriber may include its own self-test and monitoring capabilities. Furthermore, there are internal monitoring process that are used by the session control manager 200 to test that each component in the channel path is operating properly. These processes are included in the hardware fault detection module 318. For example, the hardware fault detection module 318 can include various routines to determine a failure of the server 108, a failure of the cable plant, that a STB 116 is not operational, the head end 114 is not operational, or a CCM is not operational based on responsiveness to signals generated by the session control manager 200. The session control manager 200 with this module is able to detect a variety of signal failures and monitors the components of the system for signal failures such as by polling the DVM interface 320 between sessions. The hardware fault detection module 318 communicates such information to other parts of the session control manager 200 discussed above so that the type and point of failure or defect in the system can be localized and specifically identified. This is particularly advantageous since it prevents the need to analyze the system 100 to detect and correct communications failures.

Finally, the session control manager 200 includes a DVM interface 320. The DVM interface 320 provides for communication and control of the DVMs 112. The DVM interface 320 utilizes line 158 to send control signals to the DVMs for channel allocation, error detection, and various other control functions.

Figure 4:
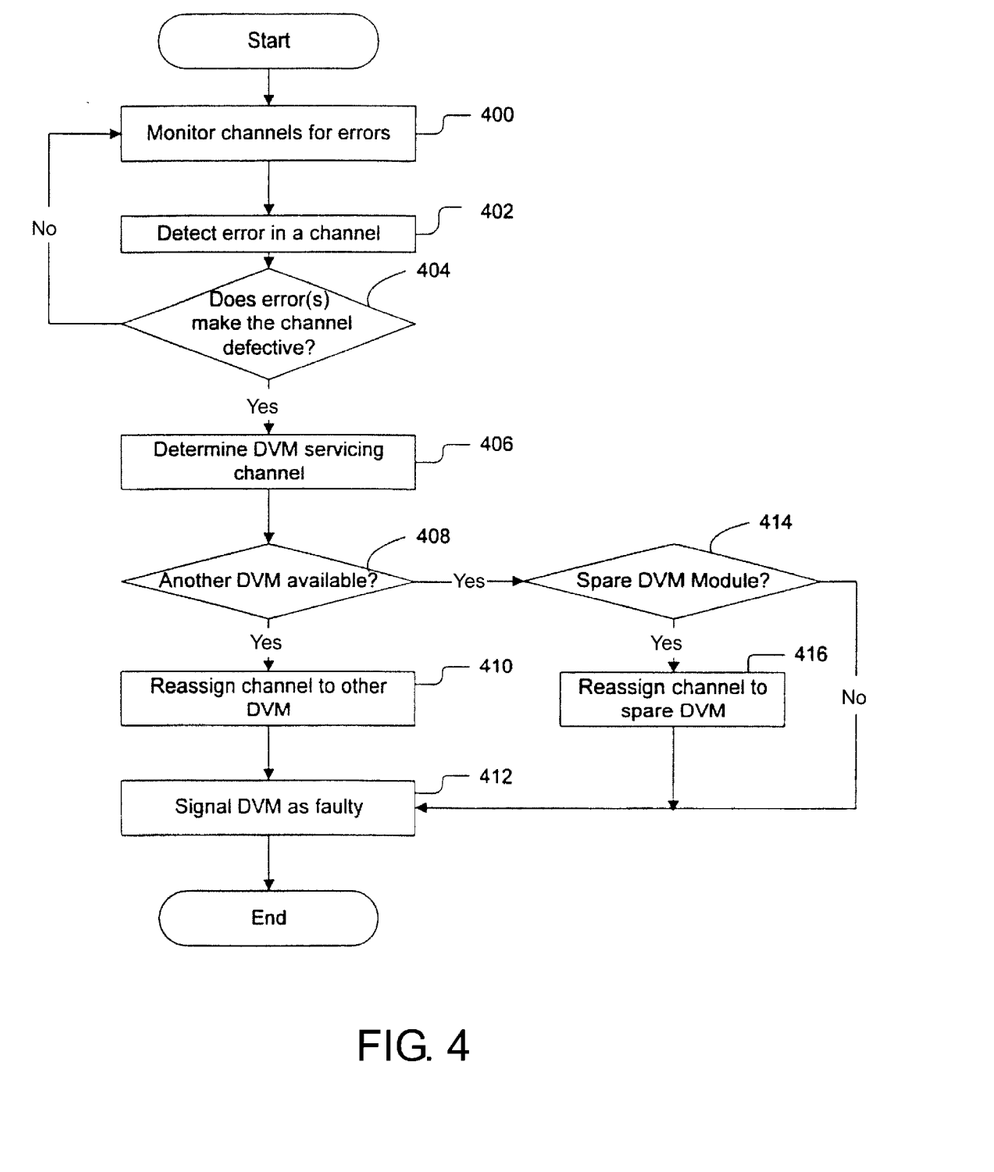
FIG. 4 is a flow chart of a first embodiment of the method for detecting a defective channel and correcting the defective channel.

Referring now to FIG. 4, a first embodiment of the method for detecting a defective channel and correcting the defective channel is shown. The preferred process begins in step 400 by monitoring one or more channels for errors. Next, in step 402, an error is detected in a channel. This could be done as has been described above by receiving a time out signal sent from a STB 116 to the session control manager 200 via a CCM 118. Then in step 404, the method determines whether the detected error is enough to make the channel defective. As note above in describing the defective channel module 312, any one of a variety of methods or a combination of the measures may be used to determine that a particular channel is defective. Next in step 406, the session control manager 200 determines the particular DVM that is servicing the channel identified to be defective. This can be done using configuration information and session structures 308 maintained by the session control manager 200. Next in step 408, the method determines if there are other modulators not currently in use that are available to transmit the data streams currently being transmitted over the defective channel. If so the process continues in step 410 by re-assigning the data streams to use another channel or another DVM 112. This is preferably done by notifying the channel re-allocation module 314 of the defective channel and the streams that need reassigning, and the channel re-allocation module 314 controls the TPM 110 to provide the data streams on the new channel. The process also signals or notifies the network management system 104 of a defective DVM and/or channel using the replacement-signaling module 316. If on the other hand, the method determines that there are no other modulators or channels available to transmit the data, the method continues to step 414. In step 414, the method determines whether the DVM module 112 has a spare DVM. If so, the spare DVM is activated and the data streams are re-assigned to use another channel or spare DVM, after which the network management system 104 is notified of the defective DVM. If there is no available bandwidth and no spare DVM, the method preferably does the only thing available which is proceeding to step 412 to notify the network management system 104. This method of the present invention is particularly advantageous because it provides a high level of availability, and takes of advantage of the fact that channel bandwidth being sub-utilized during a majority of the time for video on demand system. Therefore, the increased reliability and channel availability comes without any significant additional hardware cost.

Figure 5:
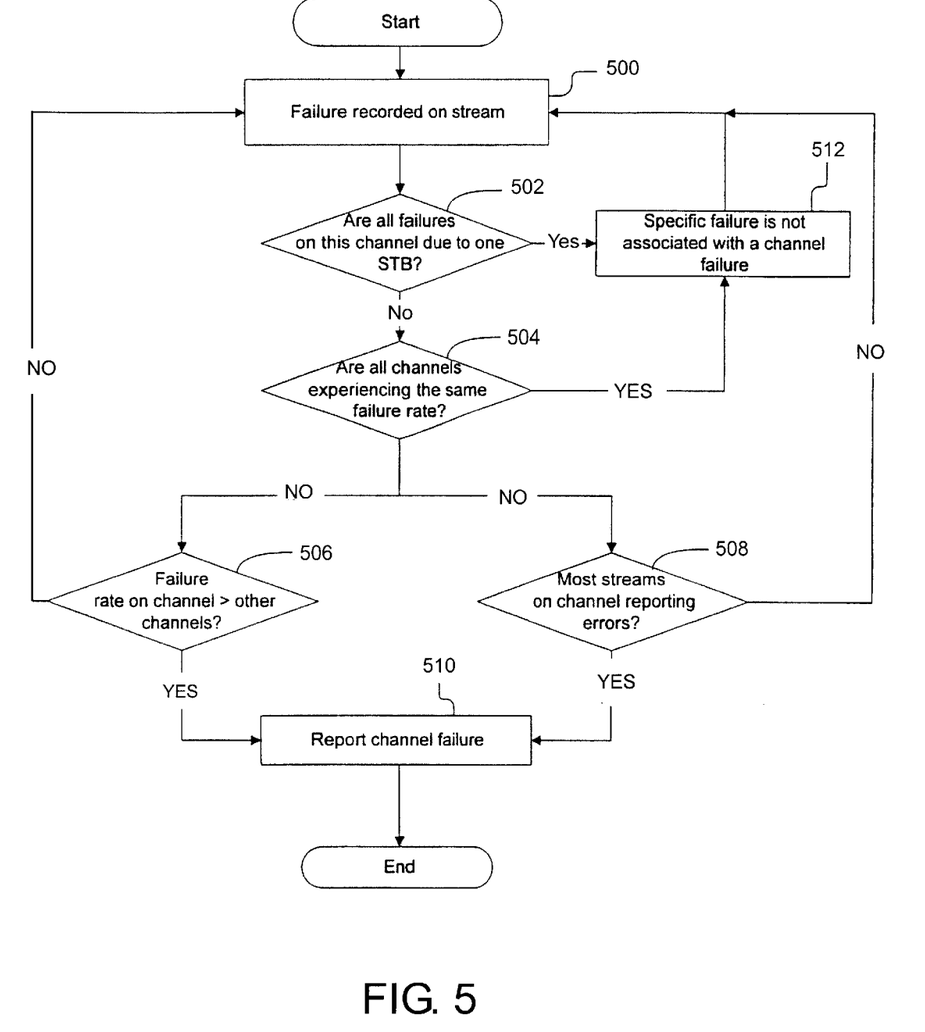
FIG. 5 is a flow chart of a second embodiment of the method for detecting a defective channel and correcting the defective channel.

FIG. 5 shows a second and more specific embodiment of the method for detecting a defective channel and correcting the defective channel. The process beings in step 500 with a failure being recorded in the transmission of a particular stream. Typically, this would be a signal from the STB 116 indicating that the signal it received from the DVM 112 via the cable network 132 is corrupted or a time out occurred because not stream was received. Next in step 502, the defective channel module 312 of the session control manager 200 determines whether all the failures on this channel are due to a single STB 116. If so, the method assumes the defect is not due to channel failure (i.e., a defective modulator), but rather due to a defective STB 116. In such a case, the method notifies the network management system 104 in step 512 and returns to step 500 to monitor for other stream failures. If all the failures on this channel are not due to a single STB 116, the method continues in step 504 to determine whether all channels are experiencing the same failure rate. If all channels are experiencing the same failure rate, then the method assumes that the failure on all channels is due to a cause other than a defective channel such as a server 108 problem or a head end 114 problem. In this case, the method continues to step 512 to notify the network management system 104 and returns to step 500 for further monitoring and error detection. However, if all channels are not experiencing the same failure rate, the method proceed to both step 506 and 508. In step 506, the method test whether the failure rate on this channel is significantly above the failure rate of other channels. If not the method returns to step 500, and assumes that the particular error detected was due to noise or other factors affecting the cable network 132. However, if the failure rate on this channel is significantly above the failure rate of other channels, the method continues to step 510 where the replacement signaling module 316 and the channel re-allocation module 314 are signal to respectively notify the network management system 104 and re-assign the stream data to other channels as has been described above. The method also tests in step 508 whether most streams assigned on the channel are reporting errors. If not the error is treated as an isolated one and the method returns to step 500. If most streams assigned on the channel are reporting errors, the channel is identified as defective, the method continues to step 510.

While the present invention has been described with reference to certain preferred embodiments, those skilled in the art will recognize that various modifications may be provided. These and other variations upon and modifications to the preferred embodiments are provided for by the present invention that is limited only by the following claims.

What is claimed is:

1. A method for detecting and correcting failure of a channel to transmit a data stream in an information distribution system, the information distribution system comprising a plurality of set top terminals and a plurality of digital video modulators the method comprising the steps of:
   automatically detecting a transmission error in a first communication channel;
   determining whether the first communication channel upon which the transmission error was detected is defective;
   re-assigning transmission of the data stream to one or more other channels by using a digital video modulator other than the digital video modulator that carries the defective channel; and
   automatically signaling replacement of the modulator that carries the defective channel.

2. The method of claim 1, further comprises the step of monitoring a first communication channel for errors.

3. The method of claim 2, wherein the step of monitoring a first communication channel for errors includes receiving error signals from one of the plurality of the set top terminals indicating that a data signal was corrupted.

4. The method of claim 1, wherein the step of detecting a transmission error in the first communication channel includes receiving error signals from one of the plurality of the set top terminals and identifying a channel being used to communicate with the set top terminal.

5. The method of claim 1, wherein the step of determining whether the first communication channel is defective includes determining whether a particular number of error signals are received from one of the plurality of the set top terminals within a pre-defined time period.

6. The method of claim 1, wherein the step of determining whether the first communication channel is defective includes determining whether the number of error signals received is greater than a pre-defined threshold.

7. The method of claim 1, wherein the step of determining whether the first communication channel is defective includes determining whether a pre-defined number of different set top terminal using the first communication channel have reported errors.

8. The method of claim 1, wherein the step of determining whether the first communication channel is defective includes determining whether the plurality of set top terminals using a set of four channels assigned to one of the plurality of digital video modulators have reported errors.

9. The method of claim 1, wherein the step of determining whether the first communication channel is defective includes determining whether a given number of channels are not operational for a particular digital video modulator.

10. The method of claim 1, wherein the step of determining whether the first communication channel is defective includes the steps of:
    determining whether all the failures on the first communication channel are due to the same set top terminal; and
    determining that the first communication channel is not defective if all the failures on the first communication channel are due to the same set top terminal.

11. The method of claim 1, wherein the step of determining whether the first communication channel is defective includes the steps of:
    determining whether other channels are experiencing the same failure rate as the first communication channel; and
    determining that the first communication channel is not defective if the other channels are experiencing the same failure rate as the first communication channel.

12. The method of claim 1, wherein the step of re-assigning transmission of the data stream to one or more other channels includes rate multiplexing the data stream over other channels and rate adjusting other data streams.

13. The method of claim 1, wherein the step of re-assigning transmission of the data stream to one or more other channels includes the steps of:
    determining the digital video modulator servicing the first communication channel;
    determining whether another digital video modulator with an available channel; and
    transmitting the data stream over the available channel of the other digital video modulator.

14. In a video-on-demand system having a plurality of communication channels for transmitting a plurality of data streams, an apparatus for detecting and correcting errors in a first transmission channel, the apparatus comprising:
    a defective channel detection module having an input and at least one output, the input of the defective channel detection module coupled to receive signals from a plurality of set top terminals, the defective channel detection module determining whether the first transmission channel is defective and generating a signal identifying the first transmission channel as defective and a current stream being transmitted on the first transmission channel; and a channel re-allocation module having an input and an output, the input of the channel re-allocation module coupled to the output of the defective channel detection module, the channel re-allocation module controlling the system to provide the current stream on a transmission channel other that the first transmission channel in response to the signal from the defective channel detection module, the output of the channel re-allocation module coupled to control the use of transmission channels in the system; and a replacement-signaling module having an input and an output, the input of the replacement-signaling module coupled to an output of the defective channel detection module, the output of the replacement-signaling module coupled to provide signals to a network management system, the replacement-signaling module signaling a particular digital video modulator as defective to the network management system in response to a signal from the defective channel detection module.

15. The system of claim 14, wherein the defective channel detection module identifies the first transmission channel as defective by receiving error signals from a set top terminal and identifying a channel being used to communicate with the set top terminal.

16. The system of claim 14, wherein the defective channel detection module identifies the first transmission channel as defective by determining whether a particular number of error signals are received from a set top terminal within a pre-defined time period.

17. The system of claim 14, wherein the defective channel detection module identifies the first transmission channel as defective by determining whether the number of error signals received is greater than a pre-defined threshold.

18. The system of claim 14, wherein the defective channel detection module identifies the first transmission channel as defective by determining whether a pre-defined number of different set top terminal using the first communication channel have reported errors.

19. The system of claim 14, wherein the defective channel detection module identifies the first transmission channel as defective by determining whether a plurality of set top terminals using a set of four channels assigned to a digital video modulator have reported errors.

20. The system of claim 14, wherein the defective channel detection module identifies the first transmission channel as defective by determining whether a given number of channels are not operational for a particular digital video modulator.

* * * * *